Dec. 18, 1962          S. M. MacNEILLE          3,068,772
VIEW AND RANGE-FINDING SYSTEM FOR CAMERAS
Filed June 8, 1959          2 Sheets-Sheet 1
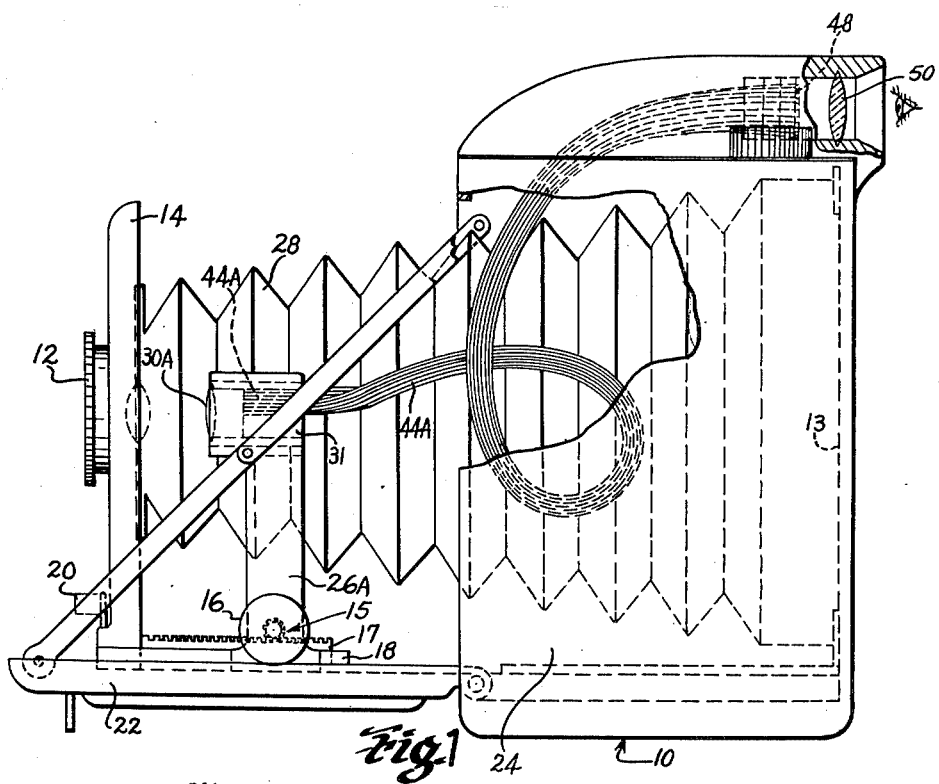
Fig. 1
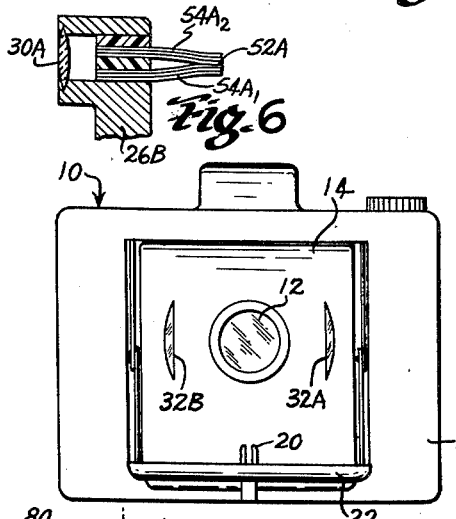
Fig. 6
Fig. 2
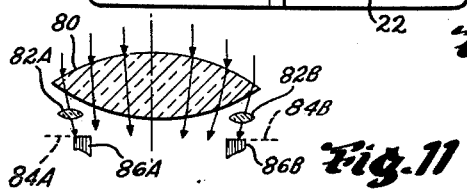
Fig. 11
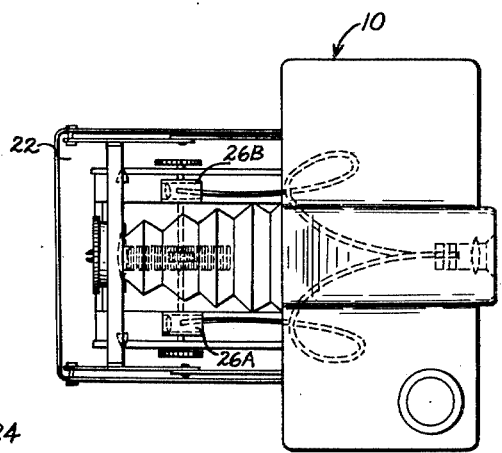
Fig. 3
INVENTOR
STEPHEN M. MacNEILLE
BY Louis L. Gagnon
Noble J. Williams
ATTORNEYS

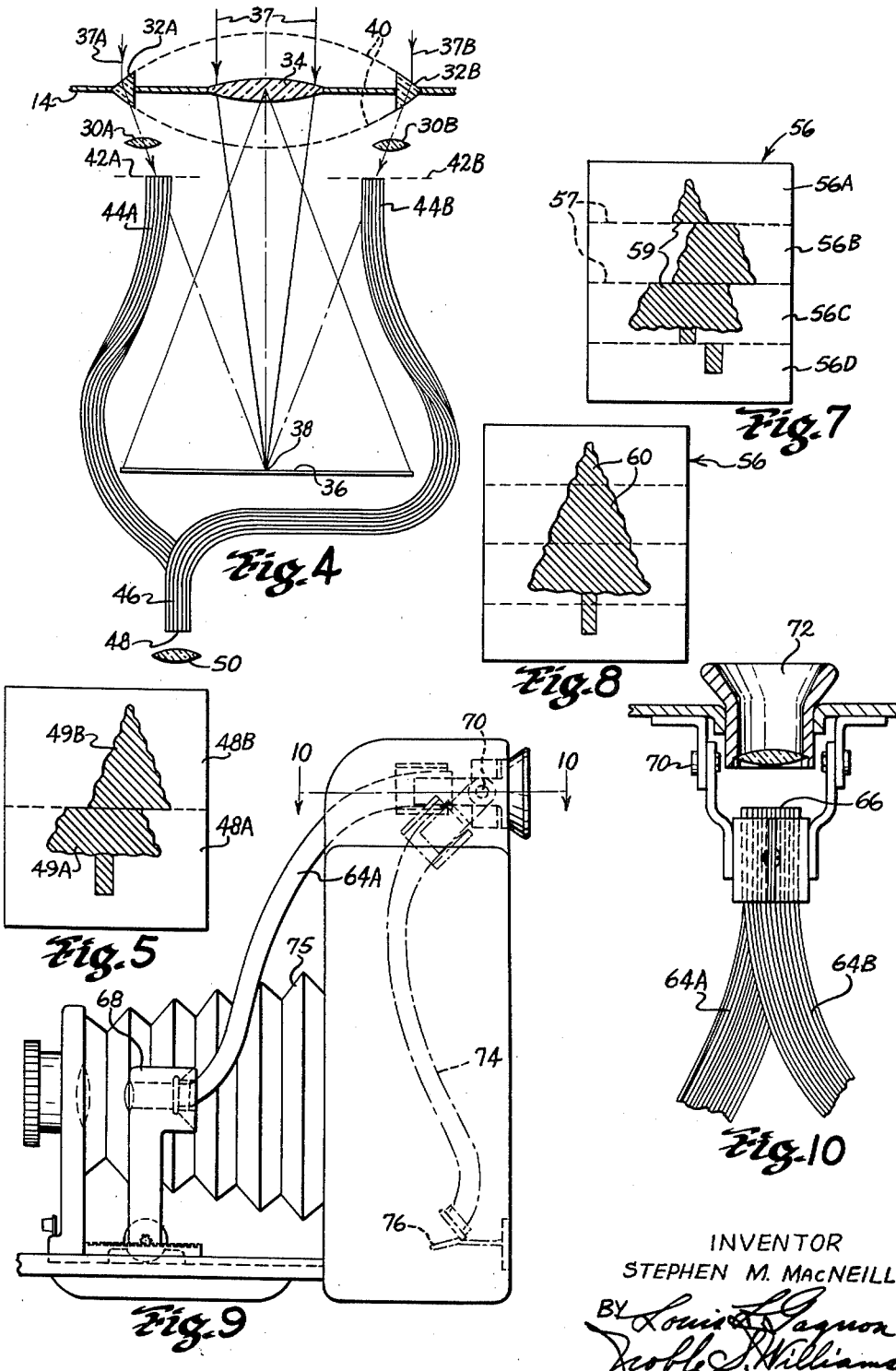

United States Patent Office 3,068,772
Patented Dec. 18, 1962

3,068,772
VIEW AND RANGE-FINDING SYSTEM FOR CAMERAS
Stephen M. MacNeille, Thompson, Conn., assignor to American Optical Company, Southbridge, Mass., a voluntary association of Massachusetts
Filed June 8, 1959, Ser. No. 818,729
10 Claims. (Cl. 95—44)

This invention relates to combined range and view-finding means for cameras and the like. More particularly, the invention relates to a combined range and view-finding system which is of such construction and arrangement and so operatively related to the camera objective associated therewith that said system not only provides a clearly defined view of the object fields to be photographed, with substantially complete freedom from parallax, but also visually indicates when said camera objective is properly focused on objects at any selected distance within the normal operating range of the camera. The combined system of the present invention, which includes fiber optical bundles for conducting images of the object field to an eye lens of the system, is such that adjustment of the range and view-finding system and of the camera objective is simultaneously provided in response to movement of a single focusing control for the camera. Furthermore, the invention is of such a versatile nature that it may be conveniently applied to both still and motion-picture cameras and to cameras of both the foldable and non-foldable types.

Many different structural arrangements have heretofore been employed with still and motion-picture cameras to provide them with range-finding means and with view-finding means and some of these have been coupled with the camera's objective so as to give automatic focusing adjustment of both while sighting through said means. Such earlier range and view-finding means, however, have been bulky, awkward, heavy and expensive and have generally been afflicted with errors of parallax. Furthermore, if the cameras were of foldable or collapsible types, these view and range-finding means were generally both optically and mechanically cumbersome and complicated. Reflex types of cameras have the desirable feature of being free from parallax but, nevertheless, have not been entirely satisfactory since they suffered from the fact that they do not give to the image being viewed as sharp a focus as might be desired. Also, reflex cameras are often bulky, heavy and expensive.

The improved range and view-finding system of the present invention, on the other hand, not only provides an enlarged clear, well-defined view which is substantially free from parallax but, at the same time, provides a divided field of view, the parts of which move relative to each other into proper registry and sharp focus as the camera objective is adjusted into correct focus, and this action is accomplished by the simple operation of focusing the camera objective in a substantially conventional fashion while sighting through the system and without requiring the use of mechanical linkages or movable mirrors or equivalent optical elements.

A distinct advantage of the improved system is the fact that an image of greater focus sensitivity can be obtained than is possible in many cameras of the direct-view type. This is due in part to the high degree of image resolution which can be had by the use of fiber optical bundles and partly due to increased image magnification obtained by the eye lens. Furthermore, the improved range and view-finding system uses fiber optical bundles in such a manner that the system may be employed conveniently with either foldable or non-folding types of cameras and requires no complicated mechanical linkages or mechanical movements nor adjustable optical components for providing the viewing, focusing and split-image range-finding adjustments mentioned above.

It is, accordingly, an object of the present invention to provide in combination with a still camera, motion-picture camera, or the like, a range and view-finding system which is substantially free from parallax and which is so coupled with the objective of the camera that adjustment of the system upon any object within the field of view thereof will automatically focus the camera objective thereon.

It is also an object of the invention to provide in such a range and view-finding system a split image field of view which is operable for all positions of focus of said objective and without requiring the use of complicated mechanical linkages, or movable mirrors or the like.

It is also an object of the invention to provide pairs of fiber optical image-conducting bundles for the novel view and range-finding system of the camera in such a manner that a clear sharp field of view, free from parallax, will be visible to the operator.

It is also an object of the present invention to provide a range and view-finding system of the above character which is inexpensive to manufacture and which will require substantially no attention or maintenance after being properly installed in an associate camera and coupled with the objective thereof.

Other objects and advantages of the invention will become apparent from the detailed description which follows taken in conjunction with the accompanying drawings in which:

FIG. 1 is a side elevational view partly in section showing a foldable camera embodying the improved range and view-finding system of the present invention;

FIG. 2 is a front view of said camera;

FIG. 3 is a plan view thereof;

FIG. 4 is a diagrammatic sketch for showing principles of operation of the range and view-finding system of the present invention;

FIG. 5 is a diagrammatic sketch showing a split-image field of view such as is obtained by the range and view-finding system of FIG. 1;

FIG. 6 is a fragmentary sectional view of a part of a modified form of the invention;

FIGS. 7 and 8 are sketches showing field of views obtained by the modified system of FIG. 6 before and after focusing adjustment of the camera;

FIG. 9 is a modified form of the invention;

FIG. 10 is a sectional view taken substantially upon section line 10—10 of FIG. 9 and looking in the direction of the arrows; and FIG. 11 is a fragmentary sectional view of a modified form of the invention.

Referring to the drawings in detail and particularly to FIGS. 1–3, it will be seen that the numeral 10 indicates generally a camera embodying an objective 12 carried by a movable front plate 14 so that said objective may be axially adjusted relative to a focal plane 13 for focusing light rays transmitted by the objective upon photographic film (not shown) at this focal plane in a conventional manner. Axial movement of the objective 12 is accomplished by rotation of a hand wheel 16 which acts through rack and pinion means 15 to move a horizontal guide plate 17 attached to front plate 14 relative to a movable supporting base 18.

When the camera is to be closed, releasable latch means 20 of more or less conventional type, may be compressed to release the movable supporting base 18 for sliding movement in guide rails (not shown) and relative to a hinged front closure member 22. At this time, the movable base 18 and objective carrying plate 14 may be slit as a unit rearwardly and into a main body portion 24 of the camera in known manner. Thereafter, closure member 22 may be swung upwardly into its closed position. The objective 12 and plate 14 as well as other associated parts of the camera may thus be entirely housed within body portion 24.

There is fixedly mounted upon the movable supporting base 18 a pair of spaced upstanding brackets 26A and 26B, one bracket at each side of the foldable bellows 28 for the camera. These brackets which move only when base 18 is moved are arranged to support short-focus lenses 30A and 30B in fixed operative positions thereon. Arranged upon movable front plate 14 and in spaced aligned relation to and forwardly of lenses 30A and 30B (see also FIG. 4) is a pair of view-finding lens segments 32A and 32B. These segments are arranged in coaxial relation to the objective 12 and have the same focal length as the effective focal length of the camera objective (diagrammatically represented in FIG. 4 by single lens 34).

If film at the focal plane 13 of the camera is represented by numeral 36 in FIG. 4 and lens 34 is in suitably focused adjustment relative thereto, light rays, as for instance rays 37, from a spaced axial object point will be focused by lens 34 at a point 38 at the plane of the film 36. At the same time, lens segments 32A and 32B, in effect, acting like edge portions of a coaxially arranged lens of appreciably higher optical speed but of the same focal length will refract (as indicated by dotted lines 40), light rays 37A and 37B from the same spaced object point towards focal point 38. However, short focal length lenses 30A and 30B are so optically aligned and disposed relative to lens segments 32A and 32B, respectively, that they will intercept these refracted image-forming rays 37A and 37B and focus same at conjugate focal planes 42A and 42B.

At focal planes 42A and 42B and suitably aligned with the refracted rays from the lens segments are disposed the entrance ends of a pair of bundles 44A and 44B of many small optically insulated light-conducting fibers. One important function of these bundles is to conduct in known manner the light of the images being formed by lenses 30A and 30B upon their entrance ends without alteration to the exit ends of the bundles. The bundles 44A and 44B in this instance are flexible, being composed of very thin fibers which are fixedly secured together only at the opposite ends. It should, of course, be kept in mind that the fibers of each bundle have their opposite ends arranged in like geometric arrangement so that each bundle will reproduce at its exit end the image impinging upon the entrance end of the bundle.

In the form of the invention disclosed in FIGS. 1–4, the exit ends of bundles 44A and 44B are brought together one above the other, as indicated at 46, so as to jointly constitute upper and lower halves of a two part split-image field at the exit end surface 48. Suitably arranged in spaced relation to this end surface is an eye lens 50 so that when the operator places his or her eye adjacent this lens, he or she may observe surface 48 appreciably enlarged as well as any image being conducted thereto by the fiber bundles. Since the lower half 48A of this surface (see FIG. 5) communicates with bundle 44A and the upper half 48B with the bundle 44B, the image of any object field formed thereon will be a two part image as indicated by shaded areas 49A and 49B. As will presently appear when the objective 12 is moved into a properly focused condition, the two parts of this split image will move into alignment with each other.

Referring again to FIG. 1, it will be noted that the bundle 44A has its entrance end positioned so as to receive only the upper half of the image formed by the short focal length lens 30A; the lower half of the image being blocked out, as by the cement 31 being used to secure the end of the fiber bundle in the tubular upper end of the bracket 26A. Thus, the area of the entrance end of bundle 44B will preferably be about twice as wide as it is high. On the other hand, the entrance end of the other bundle 44B will be of similar entrance area and shape but will be secured in the lower half of the tubular end of bracket 26B instead of in the upper half.

Thus, both of these bundles 44A and 44B (each of which is individually rotated 180° between its opposite ends for erection of image) function jointly to convey the two half images of the object field to the exit area 48, as stated previously. Here a complete and properly aligned image will be formed if the objective 12 is in a correctly focused position.

But, if the objective 12 is out of focus, it will be evident from FIG. 4 that light rays 37, for example, will be improperly imaged at a point ahead or behind focal point 38. Likewise, light rays 37A and 37B from segments 32A and 32B will be improperly directed and thus will strike lenses 30A and 30B too far to the left or too far to the right as the case may be. It follows, therefore, that these wrongly directed rays from segments 32A and 32B will be imaged by one of the lenses (30A or 30B) too far to the left side or right side and will be imaged by the other lens too far to the side in the opposite direction.

The result of such an out-of-focus condition of objective 12 will be that the two parts 49A and 49B of the image field observed through eye lens 50 will appear laterally displaced one relative to the other. Proper adjustment of control knob 16, however, to bring objective 12 into focus will also shift segments 32A and 32B fore and aft relative to lenses 30A and 30B and will cause partial images 49A and 49B to move laterally into registry with each other.

While the two bundles 44A and 44B have been grouped together, one above the other, at their exit ends to give a two-part or two-section field of view, it might be preferably at times to provide a split field having more than two sections. Thus, the modified bundle 52A, as shown in FIG. 6, aligned with short-focus lens 30A (and a similar bundle, not shown, aligned with lens 30B) may be used to provide a four-sectioned field of view. Therefore, entrance end of bundle 52A is divided into two vertically spaced sections $54A_1$ and $54A_2$ and these sections are spaced from each other by a distance substantially equal to the vertical spacing between sections. The entrance end of the fiber bundle at the opposite side of the camera likewise will comprise two sections which are similarly vertically spaced but, of course, will have their vertical arrangement oppositely disposed and thus will be supplemental to the arrangement of bundle 52A.

The reason for this more or less alternating arrangement of the four-sections at the entrance ends of the two bundles is so that at the opposite end of the bundles (which have been rotated 180° between opposite end) the sections may be brought together in properly arranged stacked relation, as suggested in FIGS. 7 and 8, wherein the field of view 56 is indicated by dotted lines 57 as divided into four similar sections 56A, 56B, 56C and 56D. While these individual sections will ordinarily be substantially indistinguishable one from another, nevertheless, if, as shown in FIG. 7, partial images are being provided thereon while objective is out of focus, an out-of-line or staggered appearance between these images will appear as suggested at 59. However, if the objective is then focused, the different parts of the image will shift into alignment and will appear in proper registry, as indicated at 60 in FIG. 8.

In FIGS. 9 and 10, a slightly modified arrangement for the range and view-finding system is disclosed in that instead of flexible bundles of light-conducting fibers, as used in FIGS. 1–3, a substantially rigid pair of bundles of fibers 64A and 64B are provided. Of course, these fibers would be arranged to come together in alternately stacked and correctly oriented relation so as to jointly form the composite viewing surface at the rear ends of the bundles as indicated at 66 in FIG. 10. It might be necessary, however, in such a case if the associated camera were arranged to fold, to be able to disconnect the forward end of each of such bundles from its supporting means 68, which means normally positions the entrance ends thereof in operative relation to the previously mentioned short-focus lenses. Also it would be necessary to pivotally connect the combined opposite ends of these bundles. Such pivotal connecting means is indicated at 70 in FIG. 10 and serves not only to pivotally support the bundle but also serves to properly hold the exit end 66 in suitably spaced relation to the eye lens 72. The bundles 64A and 64B, when disconnected from their respective supporting means 68, may be swung about pivot means 70 into the dotted line storage position indicated at 74; being at such time in straddling relation to the foldable bellows 75. Spring-retaining means therefore is indicated at 76.

It will be appreciated, of course, from a consideration of the teachings of the present invention that a single coaxial lens segment, a single, short-focus lens and a single fiber optical image-conducting bundle can be used satisfactorily (instead of pairs of these optical elements) if a view-finding system only is to be provided upon the camera. Such a view-finding system will possess the distinct advantage of being substantially free from parallax.

By suitable control of the size of the image fields provided at the entrance surfaces of the bundles 44A and 44B, it is possible to make the field of view of the range and view-finding system substantially identical with the field covered by the camera objective for all focus conditions thereof.

From the preceding description, it will be clear that diametrically opposed edge portions of the lens serving as the camera objective such as is shown at 80 in FIG. 11, may be used if desired instead of the previously mentioned pair of lens segments to form the first light-admitting elements of the improved view and range-finding system. In such a modified arrangement, aligned with these diametrically opposed edge portions will be the short-focus lenses 82A and 82B which function to focus the object field of the objective at the secondary image planes 84A and 84B so that certain of the light rays will impinge upon the entrance ends of the fiber optical image-conducting bundles 86A and 86B while the remaining light rays transmitted by the objective 80 will impinge as focused rays in conventional manner upon film (not shown) at the focal plane of the camera. Of course, such an arrangement will reduce somewhat the effectiveness of the objective being used and to offset this loss of light, an objective of higher optical speed might be preferred.

Having described my invention, I claim:

1. A camera having an objective of predetermined focal length, a range and view-finding system comprising a pair of image-forming refractive optical components of like focal length mounted on said camera in coaxial relation with said objective, adjustable means for focusing said objective, each of said refractive components being operatively connected to said objective for simultaneous movement therewith, a pair of short focus lenses in normally fixed position upon said camera, said short focus lenses being aligned with said refractive components respectively in such a manner as to intercept image-forming light rays being transmitted thereby and to form a pair of similar images thereof as secondary image planes in adjacent relation thereto, fiber optical image-conducting means having entrance surfaces disposed at said secondary image planes so as to accept the light rays forming said secondary images, and having exit surfaces disposed at a common image plane, said fiber optical means serving to conduct different portions of said secondary images to adjacent exit surfaces at said common image plane, whereby said exit surfaces will display different portions of a split image of said object field and said different portions will move into registry with each other as said objective is adjusted to focus upon said object field, and an eye lens operatively disposed relative to said common image plane.

2. A camera having an objective of predetermined focal length, a range and view-finding system comprising a pair of image-forming refractive optical components of like focal length mounted on said camera in diametrically opposed relation to each other at opposite sides of said objective and in coaxial relation therewith, adjustable means for focusing said objective, each of said refractive components being operatively connected to said objective for simultaneous movement therewith, a pair of short focus lenses in normally fixed position upon said camera, said short focus lenses being aligned with said refractive components respectively in such a manner as to intercept image-forming light rays being transmitted thereby and to form a pair of similar images thereof at secondary image planes in adjacent relation thereto, fiber optical image-conducting means having entrance surfaces so disposed at said secondary image planes as to accept the light rays forming said secondary images, and having exit surfaces disposed at a common image plane, said fiber optical means serving to conduct different portions of said secondary images to adjacent exit surfaces at said common image plane, whereby said exit surfaces will display different portions of a split image of said object field and said different portions will move into proper registry with each other as said objective is adjusted to focus upon said object field, and an eye lens operatively disposed relative to said common image plane.

3. A camera having an objective which is shiftable from an extended operative position to a retracted inoperative position when said camera is to be collapsed for storage, means for axially adjusting said objective within a predetermined focusing range at said operative position, said objective having a predetermined focal length, a range and view-finding system comprising a pair of image-forming refractive optical components of like focal length mounted on said camera in coaxial relation with said objective, said refractive components being operatively connected to said objective for simultaneous movement therewith during focusing of said objective, a pair of normally fixed short focus lenses aligned with said refractive components respectively in such a manner as to intercept image-forming light rays being transmitted by said components and to form a pair of similar images of the object field of said objective at secondary image planes adjacent thereto, fiber optical image-conducting bundles having entrance surfaces disposed at said secondary image planes so as to accept the light rays forming said secondary images, and having exit surfaces disposed in a common image plane, said fiber optical bundles serving to conduct different portions of said secondary images to said common image plane, whereby said adjacent exit surfaces will display different portions of a split image of said object field and said different portions will move into registry with each other as said objective is adjusted to focus upon said object field, an eye lens operatively disposed in a normally fixed position upon said camera adjacent said common image plane, said bundles being of such a flexible nature as to allow said short focus lenses and entrance surfaces aligned therewith to move relative to said common image plane and eye lens into a retracted position when said camera is being collapsed.

4. A camera having an objective which is shiftable from an extended operative position to a retracted inoperative position when said camera is to be collapsed for storage, means for axially adjusting said objective within a predetermined focusing range at said operative position, said objective having a predetermined focal length, a range and view-finding system comprising a pair of image-forming refractive optical components of like focal length mounted on said camera in coaxial relation with said objective, said refractive components being operatively connected to said objective for simultaneous movement therewith during focusing of said objective, a pair of normally fixed short focus lenses aligned with said refractive components respectively in such a manner as to intercept image-forming light rays being transmitted by said components and to form a pair of similar images of the object field of said objective at secondary image planes adjacent thereto, a pair of relatively rigid fiber optical image-conducting bundles having entrance surfaces disposed at said secondary image planes so as to accept the light rays forming said secondary images, and having exit surfaces disposed in a common image plane, said fiber optical bundles serving to conduct different portions of said secondary images to said common image plane, whereby said adjacent exit surfaces will display different portions of a split image of said object field and said different portions will move into registry with each other as said objective is adjusted to focus upon said object field, an eye lens operatively disposed in a normally fixed position upon said camera adjacent said common image plane, one end of each bundle being detachably supported in its operative position and the other end thereof being pivotally connected to said camera so as to allow said bundles to be readily moved to an out-of-the-way position when said camera is being collapsed.

5. A camera having an objective of predetermined focal length, a range and view-finding system comprising a pair of image-forming refractive optical components of like focal length mounted on said camera in coaxial relation with said objective, adjustable means for focusing said objective, each of said refractive components being operatively connected to said objective for simultaneous movement therewith, a pair of short focus lenses in normally fixed position upon said camera, each of said short focus lenses being aligned with one of said refractive components respectively in such a manner as to intercept image-forming light rays being transmitted thereby and to form a pair of similar images thereof at normally fixed secondary image planes in adjacent relation thereto, fiber optical image-conducting bundles having entrance surfaces disposed in spaced relation at each of said secondary image planes so as to accept the light rays forming different spaced portions of said secondary images and having their respective exit surfaces so disposed and arranged at a common image plane as to jointly provide a composite image of the object field of said objective at said common image plane, whereby said exit surfaces will display different portions of a split image of said object field and said different portions will move into registry with each other as said objective is adjusted to focus upon said object field, and an eye lens disposed in operative relation to said common image plane.

6. A camera having image-forming refractive optical means, said refractive means being movably mounted on said camera for axial adjustment thereof, manually operable means for adjusting said refractive means for focusing upon a selected object field, a range and view-finding system comprising a pair of relatively short focus lenses normally positioned in fixed spaced relation upon said camera and in aligned relation with spaced portions of said refractive means in such a manner as to intercept image-forming light rays coming from said object field and being transmitted thereby and to form a pair of similar images thereof at secondary image planes in adjacent relation thereto, fiber optical image-conducting means having entrance surfaces disposed at said secondary image planes so as to accept the light rays forming said secondary images, and having exit surfaces disposed at a common image plane, said fiber optical means serving to conduct different portions of said secondary images to adjacent exit surfaces at said common image plane, whereby said exit surfaces will display different portions of a split image of said object field and said different portions will move into registry with each other as said refractive means is adjusted to focus upon said selected object field, and an eye lens disposed in operative relation to said common image plane.

7. A camera having an objective, adjustable means for focusing said objective, a range and view-finding system comprising a pair of relatively short focus lenses normally positioned in fixed spaced relation upon said camera, and in aligned relation with diametrically opposed edge portions of said objective in such a manner as to intercept image-forming light rays being transmitted thereby and to form a pair of similar images at secondary image planes in adjacent relation thereto, fiber optical image-conducting means having entrance surfaces disposed at said secondary image planes so as to accept the light rays forming said secondary images, and having exit surfaces disposed at a common image plane, said fiber optical means serving to conduct different portions of said secondary images to adjacent exit surfaces at said common image plane, whereby said exit surfaces will display different portions of a split image of said object field and said different portions will move into proper registry with each other as said objective is adjusted to focus upon said object field, and an eye lens disposed in operative relation to said common image plane.

8. A camera having an objective of predetermined focal length, a range and view-finding system comprising a pair of image-forming refractive optical components of like focal length mounted on said camera in coaxial relation with said objective, adjustable means for focusing said objective upon a selected object field, each of said refractive components being optically connected to said objective for simultaneous movement therewith, a pair of short focus lenses normally disposed in a fixed position upon said camera, each of said short focus lenses being aligned with one of said refractive components in such a manner as to intercept image-forming light rays being transmitted thereby and to form similar images of said object field at fixed secondary image planes in adjacent relation thereto, a pair of fiber optical image-conducting bundles each having a plurality of entrance surfaces disposed in such predetermined spaced relation to each other at each secondary image plane so as to accept the light rays forming different portions of said secondary images, said bundles having exit surfaces corresponding to said entrance surfaces so disposed and arranged in stacked alternate relation to each other at a common image plane as to provide a multiple section composite image of said object field, whereby when said objective is adjusted to focus upon said object field, said individual sections of said composite image at said common image plane will move into common registry, and an eye lens disposed in operative relation to said common image plane.

9. A camera having an objective of predetermined focal length, a view-finding system comprising an image-forming refractive lens component of like predetermined focal length disposed adjacent said objective and having its optical axis in coaxial relation with the optical axis of said camera objective, adjustable means for axially moving said camera objective for focusing said objective relative to a fixed focal plane in said camera, means securing said refractive lens component to said camera objective for similar simultaneous axial movement during said focusing adjustment, a relatively short focal length lens mounted in a relatively fixed operative position on said camera and with reference to the fixed focal plane therein during use of said camera, the fixed operative position of said short focal length lens being near said refractive lens component and aligned therewith in such a manner as to receive light rays transmitted thereby and coming from the same object field as viewed by said camera objective, said short focal length lens being spaced sufficiently from said refractive lens component to allow normal focusing adjustment of said camera objective and similar movement of said refractive lens component, said short focal length lens together with said refractive lens component serving to form a secondary image of said light rays at a secondary image plane a relatively short predetermined fixed distance from said short focal length lens, a relatively long fiber optical image-conducting bundle having an entrance end surface disposed at said secondary image plane so as to accept the light rays forming said secondary image and an exit end surface spaced appreciably therefrom, said fiber optical bundle serving to transfer said secondary image from said secondary image plane to said exit end surface, and an eye lens conveniently carried by said camera and arranged to focus upon said exit end surface, whereby a substantially parallax-free view of the object field of the camera objective, and at increased focus sensitivity as compared with the sharpness of focus obtained by a conventional reflex-type camera, will be provided by said view-finding system.

10. A collapsible camera having an objective of predetermined focal length, a view-finding system comprising an image-forming refractive lens component of like predetermined focal length disposed adjacent said objective and having its optical axis in coaxial relation with the optical axis of said camera objective, adjustable means for axially moving said camera objective for focusing said objective relative to a fixed focal plane in said camera, means securing said refractive lens component to said camera objective for similar simultaneous axial movement during said focusing adjustment, a relatively short focal length lens mounted in a relatively fixed operative position on said camera and with reference to the fixed focal plane therein during use of said camera, the fixed operative position of said short focal length lens being near said refractive lens component and aligned therewith in such a manner as to receive light rays transmitted thereby and coming from the same object field as viewed by said camera objective, said short focal length lens being spaced sufficiently from said refractive lens component to allow normal focusing adjustment of said camera objective and similar movement of said refractive lens component, said short focal length lens together with said refractive lens component serving to form a secondary image of said light rays at a secondary image plane a relatively short predetermined fixed distance from said short focal length lens, a relatively long fiber optical image-conducting bundle having an entrance end surface disposed at said secondary image plane so as to accept the light rays forming said secondary image and an exit end surface spaced appreciably therefrom, said fiber optical bundle serving to transfer said secondary image from said secondary image plane to said exit end surface, and an eye lens conveniently carried by said camera and arranged to focus upon said exit end surface, said fiber optical means being flexible intermediate its ends so as to allow relative movement between said ends during collapsing of said camera, whereby a substantially parallax-free view of the object field of the camera objective, and at increased focus sensitivity as compared with the sharpness of focus obtained by a conventional reflex-type camera, will be provided by said view-finding system.

References Cited in the file of this patent

UNITED STATES PATENTS

| | | |
|---|---|---|
| 1,751,584 | Hansell | Mar. 25, 1930 |
| 1,848,814 | Allen | Mar. 8, 1932 |
| 2,107,829 | Kuppenbender | Feb. 8, 1938 |
| 2,124,468 | Parlini | July 19, 1938 |
| 2,283,077 | Maurer | May 12, 1942 |
| 2,341,410 | Mihalyi | Feb. 8, 1944 |
| 2,877,368 | Sheldon | Mar. 10, 1959 |